Patented Oct. 8, 1946

2,408,752

UNITED STATES PATENT OFFICE

2,408,752

PREPARATION OF BRANCHED CHAIN HYDROCARBONS

Robert E. Burk, Cleveland Heights, Ohio, assignor to The Standard Oil Company, Cleveland, Ohio, a corporation of Ohio No Drawing. Application April 18, 1942, Serial No. 439,543

2 Claims. (Cl. 260—683.5)

In the common procedure of catalytic isomerization there is considerable side reaction of breaking up of molecules or cracking. This interferes with the production of the desired kind of hydrocarbons, and also represents a corresponding amount of waste of material. I have found that if isomerization be carried first to only a slightly branched condition and an isomer be fractioned out relatively clean from the reaction mixture, this clean cut can be then isomerized quite drastically without cracking. Different equilibrium conditions are involved thus stagewise, instead of in the customary run-through with a starting material, and the usual cracking loss may be obviated, and desired isomer products be obtained.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

As raw material, hydrocarbons which it is desired to isomerize, in general may be applied. The light hydrocarbons, as of five to eight carbon atoms are especially applicable. Naphthas may be thus treated. These are desirably fractionated into cuts corresponding to hydrocarbons of a given number of carbon atoms which are then isomerized separately. The hydrocarbons to be isomerized in the first step of the operation may be normal saturated hydrocarbons. Any convenient source of hydrocarbons may be used however. In some cases it is desirable to start with slightly branched hydrocarbons. Where the hydrocarbon stocks or raw material contain unsaturated and aromatic hydrocarbons in addition to paraffin hydrocarbons, these may be removed, for example by extracting with selective solvents or by reacting with halides for that purpose.

As catalysts, the halide catalysts in general may be employed. Advantageous are the aluminum halide catalysts, such as aluminum chloride, aluminum bromide, or complexes formed by these halides with hydrocarbons, or alkyl halides may be used; also other halides such as acid-acting halides of zinc, iron, arsenic, antimony, tin, boron, etc. Mixtures of such catalysts are desirable in some instances. The amount of catalyst may be 1 to 10 mol per cent based on the hydrocarbon. It is desirable to promote the halide catalyst by a hydrogen halide, as for example hydrogen bromide, hydrogen chloride, hydrogen fluoride; and these may be in liquid or gaseous state. Pressures up to 200 pounds per square inch may be applied in the reaction zone with the halide in the gaseous state. When the hydrogen halide is maintained as a liquid sufficient pressure is used to preserve the liquid phase. An especially effective catalyst is a liquid HF—BF$_3$ catalyst, the partial pressure of boron fluoride being 50 to 550 pounds per square inch, preferably 150 pounds.

The operating temperatures in general desirably are low, under 100° C. Preferably they may be below ordinary temperature and in the range on down to minus 25 or 30° C.

Where desired, isobutane may be present, 1–10 mols, preferably 2 or 3 mols. Hydrogen may desirably also be present.

The hydrocarbons to be treated are subjected to the aforedescribed conditions for a time depending on the temperature, the particular composition of the catalyst, etc., to convert them to slightly branched hydrocarbons. Then, the halide catalysts are removed, such as by freezing out, or by distillation or other desired way, and the hydrogen halide may be removed by releasing pressure, neutralizing, etc. Then the products are fractionated to separate the slightly branched hydrocarbons, and such thus in relatively pure form are then subjected to the aforedescribed conditions to isomerize them into more highly branched hydrocarbons. Where desired, this product may be then fractionated, and a relatively pure branched isomer may be again further subjected to the isomerization.

As an example: N-hexane is treated with 10 mol per cent of AlBr$_3$ plus HBr, the temperature being not higher than 0° C., and preferably the operation being started at minus 20° C. After about 130 hours, depending upon the precise temperatures maintained, the product contains something over half isomers, 2-methyl pentane being largely predominant. Some neohexane is also formed. The product is fractionated, and the 2-methyl pentane cut is subjected to 10 mol per cent of aluminum bromide and hydrogen bromide at about minus 11° C. for about 217 hours. The product is mostly more highly isomerized hexanes, especially 3-methyl pentane, and smaller amount of 2,3-dimethyl butane. These may be fractionated out and again be separately subjected to the halide catalyst for further isomerization.

As another example: 3-methyl pentane is treated at minus 11° C. with 10 mol per cent AlBr$_3$ plus HBr. After about 337 hours 87.24 per cent of the products are isomers of 3-methyl pentane, and only 5.72 per cent of cracked products, isobutane and isopentane, are formed. N-hexane treated under similar conditions yields 20.3 per cent cracked products and only 52.4 per cent of isomers.

As another example: 2,3-dimethyl butane treated as in the foregoing example yields a product containing 76.4 per cent of isomeric hexanes, 27.2 per cent being neohexane. No isobutane is formed, and only 0.1 per cent of isopentane.

Other modes of applying the principle of the invention may be employed, change being made as regards the details described, provided the features stated in any of the following claims, or the equivalent of such, be employed.

I therefore particularly point out and distinctly claim as my invention:

1. A process for converting normal to slightly branched hydrocarbons to highly branched isomers by a unitary two-stage process, which comprises subjecting hydrocarbons having 5 to 8 carbon atoms—closely fractionated to contain primarily normal to slightly branched paraffinic hydrocarbons of the same number of carbon atoms—to isomerization with a halide catalyst at a temperature below ordinary temperature to form isomers slightly more branched than said starting hydrocarbons, separating the so-formed slightly branched isomers from the remaining hydrocarbons and subjecting said separated isomers to further isomerization with a halide catalyst at a temperature below ordinary temperature to form more highly branched isomers.

2. A process for converting normal to slightly branched hydrocarbons to highly branched isomers by a unitary two-stage process, which comprises subjecting hydrocarbons having 5 to 8 carbon atoms—closely fractionated to contain primarily normal to slightly branched paraffinic hydrocarbons of the same number of carbon atoms—to isomerization with an aluminum halide catalyst promoted by hydrogen halide at a temperature below ordinary temperature to form isomers slightly more branched than said starting hydrocarbons, separating the so-formed slightly branched isomers from the remaining hydrocarbons and subjecting said separated isomers to further isomerization with an aluminum halide catalyst promoted by a hydrogen halide at a temperature below ordinary temperature to form more highly branched isomers.

ROBERT E. BURK.